United States Patent [19]

Wilson

[11] 3,761,036

[45] Sept. 25, 1973

[54] TAPE DRIVE

[75] Inventor: John H. Wilson, Tulsa, Okla.

[73] Assignee: Telex Computer Products, Inc., Tulsa, Okla.

[22] Filed: Nov. 17, 1971

[21] Appl. No.: 199,697

[52] U.S. Cl. .............................................. 242/183

[51] Int. Cl.. G11b 15/32, G11b 15/58, G11b 23/12

[58] Field of Search ............................ 242/182–185; 226/95, 97

[56] References Cited

UNITED STATES PATENTS

| | | | |
|---|---|---|---|
| 3,180,549 | 4/1965 | Buhrendorf et al. | 226/97 |
| 3,645,471 | 2/1972 | Kjos | 242/182 |

*Primary Examiner*—Leonard D. Christian
*Attorney*—Head & Johnson

[57] ABSTRACT

An improved tape deck for a magnetic tape handling system, which has particular advantages as relates to minimizing wear on the oxide surface of the tape and providing fast response of the tape to the drive of the capstan.

The file reel and machine reel are mounted on the upper portion of the tape deck, which is rectangular in shape. The entire lower edge is formed of one wall of each of four vacuum columns, of which two are principal columns and two are auxiliary vacuum columns. The ends of the two principal columns are positioned at the opposite edges of the tape deck. In the center portion of the wall along the lower edge of the deck is a Y-shaped wall which, in the space between the arms of the Y and the wall at the lower edge of the tape deck form two auxiliary vacuum columns.

A single capstan is used, which is placed at the end of one arm of the Y, and in the corresponding position on the end of the other arm, is a free-running roller. The tape is threaded, oxide surface up, over the capstan and the roller and is drawn down into the vacuum columns by atmospheric pressure on the top of the tape.

The magnetic head system, including read-write and erase heads, is placed above the tape with the head gaps on the bottom surface, in contact with the oxide coating of the tape. However, by applying vacuum to the triangular shape chamber below the tape, between the arms of the Y, the tape can be drawn out of contact with the heads.

6 Claims, 2 Drawing Figures

PATENTED SEP 25 1973

3,761,036

TAPE DRIVE

CROSS-REFERENCE TO RELATED APPLICATION

This application is related to a copending application owned by the same Assignee; inventor Joseph D. Henderson, Title: Vacuum Column For Reel Servo, Ser. No. 192,076 filed Oct. 23, 1971.

BACKGROUND OF THE INVENTION

This invention relates to web or tape feeding devices. More particularly, it is concerned with a tape drive system for magnetic recording and playback purposes.

Still more particularly, it is concerned with a tape drive means that minimizes tape wear on the magnetic oxide coating surface.

The prior art on magnetic tape drive system is quite voluminous and covers many of the features that are in daily use on machines of this type. Some of them include some of the features of this present invention, but to the knowledge of the inventor, there is no prior art teaching of the specific combination of elements, which combine in this invention, to provide an ideal drive for magnetic tape systems.

SUMMARY OF THE INVENTION

It is an object of this invention to provide a tape drive system which minimizes tape wear and increases reliability.

It is a further object of this invention to provide a tape recording system in which the oxide coated surface of the tape contacts only the read/write head system. All other surfaces which control the movement of the tape contact only the plastic back surface of the tape.

It is a further object of this invention to provide a design which fits conveniently into a small volume and provides a straight line threading for the tape and simplified construction of vacuum buffers, etc.

It is a still further object of this invention to provide a tape drive system in which the oxide coated surface of the tape is normally pressed in contact with the magnetic head system, but by the application of vacuum to a buffer chamber, the tape can be pulled away from the face of the head system so that on rewind, or on rapid forward drive, where recording is not desired, the tape can be driven past the heads with the oxide surface out of contact with any physical surface.

This invention is characterized by a design of the tape deck of a magnetic tape handling system in which the file reel and the machine reel are placed near the top of the vertical deck. The tape deck is approximately twice as long as it is wide. The entire lower edge of the tape deck is occupied essentially by four tape columns, two principal columns and two auxiliary columns.

The two principal columns are in opposed position and have their closed ends at either edge of the tape deck. In the center of the deck at the lower edge is a Y shaped wall which forms the two auxiliary vacuum columns in the corner between the branches of the Y and the wall at the base of the tape deck. The capstan is placed at the end of one arm of the Y and a free running roller at the end of the other arm of the Y. The tape stretches between the two, with oxide face upward, and the magnetic head system, including read/write and erase heads, and EOT and BOT sensing, are provided in a structure above the tape, with gaps at the bottom in contact with the tape.

The triangular chamber between the tape and the two arms of the Y forms a vacuum buffer. With vacuum applied in this space the tape can be drawn downwardly out of contact with the face of the magnetic head system.

BRIEF DESCRIPTION OF THE DRAWINGS

These and other objects of this invention and a better understanding of the principles and details of the invention will be evident from the following description taken in conjunction with the appended drawing in which.

DESCRIPTION OF THE PREFERRED EMBODIMENT

Figures 1, 2:
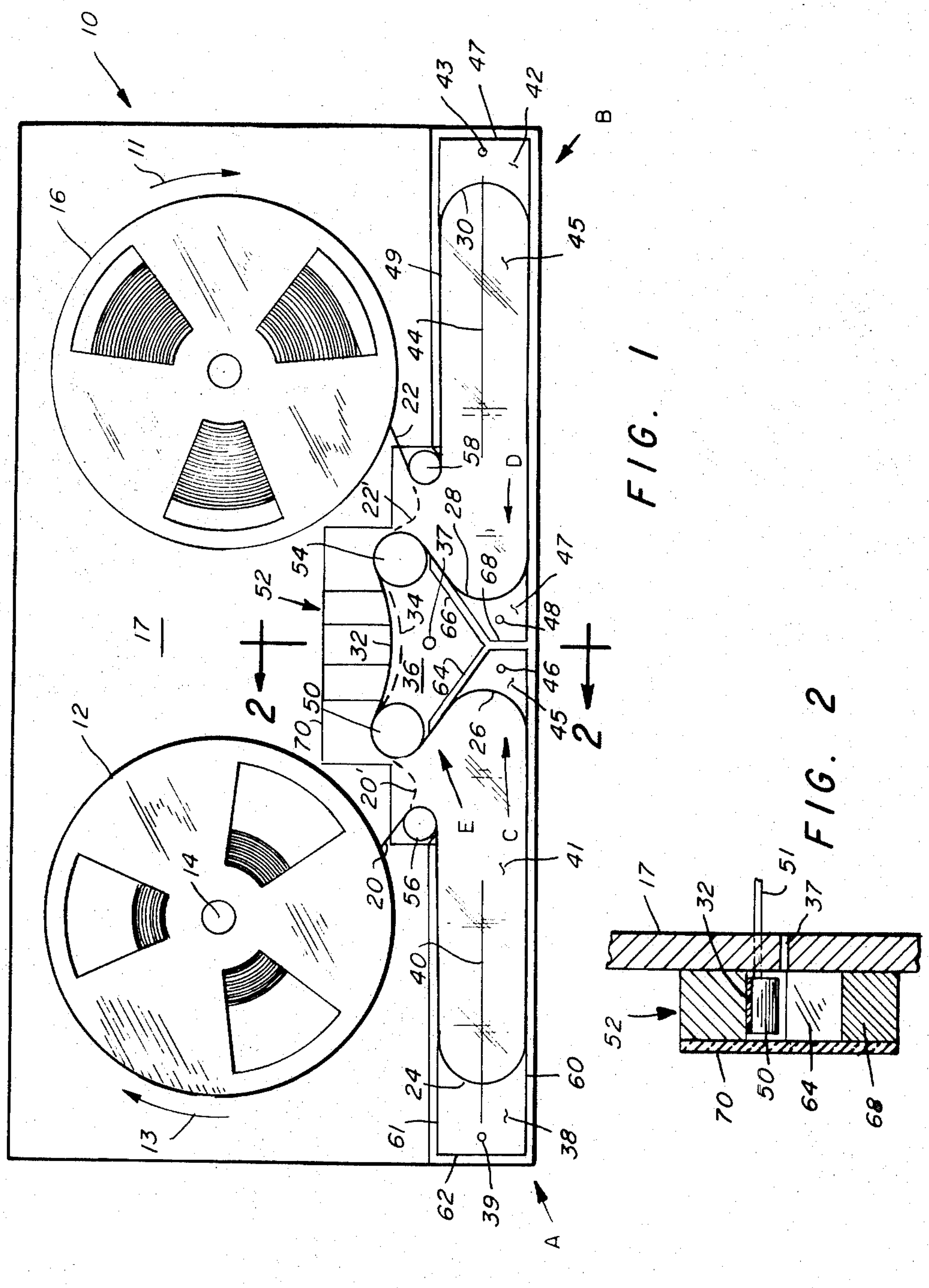
FIG. 1 is an elevational view of the tape deck of this invention.
FIG. 2 is a view, in section, taken along line 2—2 of FIG. 1.

Referring now to the drawing, the numeral 10 indicates generally the tape deck of the magnetic tape handling system. No mention will be made of the motor drives, vacuum, and other apparatus, etc., normally utilized in a magnetic drive system. These are all conventional, and any of the many commercial types available on the market can be used in this invention. The novelty of the invention lies solely in the design of the tape deck, and the configuration of the principal vacuum columns, auxiliary vacuum columns, and vacuum buffer, and the general arrangement of tape movement, which provides simplicity of control, ease of threading of the tape and minimization of wear on the oxide surface of the tape.

Two spindles 14 and 18 are provided passing through the plate 15, on which are mounted the reels 12 and 16, respectively, which for forward drive, that is, for drive from the file reel to the machine reel, the reels move in the direction of the arrows 13 and 11. In the lower portion of the tape deck are a series of walls mounted to plate 17; numeral 60 along the complete bottom of the deck, 62 on the left edge of the deck, 47 on the right edge of the deck, and two shorter walls 61 and 49 which join the walls 62 and 47, respectively, and are parallel to the bottom wall 60. Walls 61 and 49 terminate in free-running rollers 56 and 58. In the center of the deck there is a short vertical wall 68 which joins the bottom wall 60 and joins two angular arms 64 and 66, the three of which, 68, 64 and 66, form essentially a Y-shaped structure. At the end of the left arm 64 of the Y is the capstan 50 which is driven by a shaft 51 from a motor mounted behind the plate 17 (not shown) but well known in the art. At the end of the right arm of the Y is a free-running roller 54, which is in a comparable position, and preferably of the same diameter, as the capstan 50. All of the walls 60, 62, 47, 61, 49, 68, 64, 66 are of the same width (approximately the width of the tape) and are covered with a glass plate 70 to form closed chambers.

The tape 22 is reeled off of the file reel, carried across the top of roller 54, and over the top of capstan 50 and wrapped around the reel 12 which is the machine reel. The numeral 20 indicates the tape at reel 16 and various other designations will be given to the tape in various portions of the tape path.

In the center of the tape deck is the magnetic head structure shown generally by the numeral 52. This includes the read/write, erase heads, end of tape and beginning of tape sensing, etc., which are commonly used in magnetic tape systems of this type. Since there are no particular features of the head system involved in this invention, no details of the head structure will be provided. Reference is made to any conventional source of catalog or textbook information on the subject.

Consider the vacuum column A formed by walls 60, 61 and 62. When the tape loop 24 is in the vacuum column A, in the space 41 to the right of the tape loop 24 is atmospheric pressure. To the left of the tape loop, in the space 38 is vacuum pressure. This is provided through an aperture 39 in the plate 17 which is connected to a vacuum reservoir (not shown).

Also, there are a series of openings and a channel 40 cut into the plate 17, by means of which the position of the tape loop 24 can be sensed in a longitudinal direction in the vacuum column A. This sensing means is fully described in a copending application in the name of Joseph D. Henderson, entitled Vacuum Column For Reel Servo, which is included herein by reference. However, other conventional tape loop position-sensing methods can be used to sense the position of the loop 24, so as to control the drive of reel 12, which is conventional in all respects and is well known in the art.

In a similar manner the vacuum column B on the right, is formed by walls 60, 49, and 47. With the tape loop 30 in the position shown the space 45 to the left of the loop is at atmospheric pressure and the space 42 to the right of the tape loop 30 is at vacuum pressure, which is communicated to the space through an aperture 43 in the plate 17 which is connected to the vacuum reservoir. A sensing system 44, similar to 40, to control reel 16 is provided.

The tape 21 threaded over and around the roller 58 and into loop 30 in vacuum column B follows along wall 60 and forms tape loop 28 in the auxiliary vacuum column D in the space between arm 66, wall 68, and wall 60. The space 47 to the left of the tape loop 28 is at vacuum pressure, which is provided by an aperture 48 in the wall 17, which is connected to the vacuum reservoir (not shown).

The tape then follows up along the underside of the right arm 66 of the Y, over roller 54, under tape head 52, over capstan 50 and then into the space under the left arm 64 of the Y which forms auxiliary vacuum column C. Here the loop 26 is, in a similar manner, held in that space by vacuum in space 45, provided through an aperture 46 in the plate 17.

Consider that the file reel is mounted on spindle 18 and the tape 22 then is drawn, in accordance with the dashed line 22' over the roller 54, under the head system 52, over the capstan 50 and along the dashed line 20' to the hub of machine reel 12. With the tape 22' and 20' hanging loose, so that it is in contact with the rollers 58 and 56, if vacuum is applied to the vacuum columns A, B, C and D, the tape will be drawn downward and into the two principal vacuum columns A and B, and the two auxiliary vacuum columns C and D. Vacuum is not yet applied to the space 36 so that the normal tension in the tape provided by the vacuum will keep the oxide coating of the tape, which is uppermost, in firm record-transmitting contact with the head system.

It is well known that in the use of two series-operative vacuum columns in conjunction with each of the reels, one or the other of the two must be more rapidly acting, and that one preferably must be in the region of the capstan. Thus, in order to get the capstan to operate most rapidly and to accelerate the tape over the capstan surface, the auxiliary vacuum columns C and D must act more rapidly than the principal vacuum columns A and B. This is accomplished by making the opening, or mouth, of the vacuum columns C and D of larger width, so that when the vacuum pressure is applied, a stronger force to provide tension in the tape is available at the auxiliary columns C and D than at the principal columns A and B. Thus, as tape is called for or supplied by the capstan, it is taken care of first by the auxiliary columns C and D and then adjusted for by the principal columns A and B which with the appropriate sensors 40 and 44 then control the reels to adjust the proper position of the tape loops 24 and 30 in the sensor system.

This design of tape contour is ideal in the sense that when the oxide surface of the tape is uppermost, the only contact that the oxide surface has in its travel from one tape reel to the other, is with the working surface of the head system. All contacts with the rollers, capstans, and with the walls of the vacuum columns is between the uncoated back surface of the tape. There is no wear on the oxide surface except that due to contact with the heads.

However, there are many times when the tape is to be rewound, for example, or when it is to be driven in fast forward direction, that the tape does not need to be in physical contact with the head. In such case, vacuum is applied through the aperture 37 to the space 36. This draws the tape 32 down to the dashed position 34 where it is out of contact with the head system and is free to run, with the oxide coating entirely free of any contacting surface.

It is clear from the description that this design is simple to construct, provides a straight line path for threading the tape. It provides two systems of vacuum columns, one of which is faster operating than the other and therefore permits higher acceleration rates for the tape. It provides a single capstan instead of requiring two capstans, (although two may be used). The operating capstan has a 180° wrap which gives it substantial torque to grasp and accelerate the tape. This, combined with the small mass of the tape provided in the auxiliary columns C and D permits extremely rapid acceleration of the tape. Most important, the oxide coating is out of contact with all surfaces except the working surface of the head system and can even be pulled out of contact with this surface by means of a vacuum buffer.

While the invention has been described without reference to the details of the tape loop sensing system, the reel drives, the vacuum system and many other features of a complete working tape drive assembly which would utilize this invention, all this auxiliary equipment is well known in the art, is covered in many textbooks and in catalogs, so that detailed description thereof would not be necessary or desirable. Also, references made to free-running rollers are meant to include all known equivalents, such as air bearings, etc.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

I claim:

1. In a magnetic tape handling system, including a tape deck, means to drive and control a file reel of tape and a machine reel, a vacuum source, vacuum control means, capstan drive means, and head means, the improvements in said tape deck comprising:

two spaced apart, open ended main vacuum columns each arranged to receive a loop of said tape;

a first tape bearing means at the end of one of said main vacuum columns and a second tape bearing at the end of the other of said main vacuum columns;

a Y-shaped wall centered below said head means, the stem of the Y and the under surfaces of the two arms of the Y forming two auxiliary vacuum columns, each communicating with a said main vacuum column;

a capstan means positioned at the end of the first arm of said Y and a third tape bearing means at the end of the second arm of the Y, the head means being mounted to the tape deck within the arms of said Y with the tape engaging surface being directed downwardly;

whereby, when said tape is looped from said file reel to said machine reel with the oxide coated surface upper-most, and said tape is threaded above said three tape bearing means and said capstan and below said head means, then when vacuum is applied to said four vacuum columns, said tape will be drawn down into each of said four vacuum columns and into contact with said head.

2. A magnetic tape handling system according to claim 1 wherein said two main vacuum columns are arranged along the bottom edge of said tape deck facing each other, with one edge of each forming a bottom wall along the full length of the bottom edge of said tape deck, and their ends along opposite edges of said tape deck, the top walls of said main vacuum columns extending from each edge part way toward the center of the tape deck, the inner ends of said top walls terminated at said first and second tape bearing means, and wherein said Y-shaped wall is centered above the bottom wall and forms said two auxiliary vacuum columns in the two spaces between the bottom wall, the stem of the Y and the under surfaces of the two arms of the Y.

3. A magnetic tape handling system according to claim 1 including a vacuum buffer means in the space between the arms of said head means.

4. A magnetic tape handling system according to claim 1 wherein said tape bearing means include free running roller means.

5. The tape deck as in claim 1 in which the mouths of said auxiliary vacuum columns are wider than the mouths of said main vacuum columns.

6. The tape deck as in claim 3 including means to apply vacuum to said buffer whenever said tape is to be transported out of contact with said head means.

* * * * *